(12) United States Patent
Liu et al.

(10) Patent No.: US 7,522,585 B2
(45) Date of Patent: Apr. 21, 2009

(54) METHOD FOR HANDOFF FROM PACKET SWITCHING DOMAIN TO CIRCUIT SWITCHING DOMAIN AND EQUIPMENT THEREOF

(75) Inventors: Wenyu Liu, Shenzhen (CN); Fang You, Shenzhen (CN); Jie Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 11/499,925

(22) Filed: Aug. 7, 2006

(65) Prior Publication Data

US 2007/0058791 A1  Mar. 15, 2007

(30) Foreign Application Priority Data

Aug. 8, 2005 (CN) .................... 2005 1 0089836

(51) Int. Cl.
*H04L 12/66* (2006.01)
(52) U.S. Cl. .................. 370/354; 370/353; 370/355; 370/356; 455/439
(58) Field of Classification Search ........... 455/436, 455/439; 370/352, 331, 335, 342, 522
See application file for complete search history.

(56) References Cited

U.S. PATENT DOCUMENTS 6,721,565 B1    4/2004  Ejzak et al. ............... 455/436
7,295,843 B2 *  11/2007 Ejzak et al. ............... 455/442
2004/0259549 A1* 12/2004 Ejzak et al. ............... 455/439
2005/0070288 A1  3/2005  Belkin et al.

(Continued)

FOREIGN PATENT DOCUMENTS

EP          1 182 900 A1     2/2002

(Continued)

OTHER PUBLICATIONS

TSG SA, Cover Sheet for Presentation of TR 23.806 to TSG SA "for information" TR 23.806 V1.0.0 "Voice Call Continuity Between CS and IMS Study", [Online] May 30, 2005, pp. 1-126.

(Continued)

*Primary Examiner*—Fan Tsang
*Assistant Examiner*—Simon King
(74) *Attorney, Agent, or Firm*—Marshall, Gerstein & Borun LLP

(57) ABSTRACT

The present invention discloses a method for handoff from a PS domain to a CS domain, including: the MS obtaining a handoff number and initiating a CS domain session request by taking the handoff number as a called number; a network side associating the CS domain session request to an original session of the MS and notifying the MS to finish an air interface handoff; the MS notifying the network side to finish a network side handoff. The present invention also discloses a CS domain access network simulating entity, a PS domain access network and an MS thereof. By adopting the solution, it is not necessary to modify existing network cells in the CS domain network, and the routing process is simplified. It is not necessary for handoff control layer entities to simulate original services of the CS domain. There is no new requirement for functions of the MGCF entity.

13 Claims, 9 Drawing Sheets

U.S. PATENT DOCUMENTS

| | | | |
|---|---|---|---|
| 2005/0243870 A1* | 11/2005 | Balogh et al. | 370/522 |
| 2005/0245261 A1* | 11/2005 | Ejzak | 455/436 |
| 2005/0245263 A1* | 11/2005 | Ejzak | 455/445 |
| 2006/0083199 A1* | 4/2006 | Yang | 370/331 |
| 2006/0121902 A1* | 6/2006 | Jagadeesan et al. | 455/439 |
| 2006/0258394 A1* | 11/2006 | Dhillon et al. | 455/552.1 |

FOREIGN PATENT DOCUMENTS

| | | |
|---|---|---|
| WO | WO 01/82551 A2 | 11/2001 |
| WO | WO 02/067617 A1 | 8/2002 |
| WO | WO 2004/110092 A1 | 12/2004 |

OTHER PUBLICATIONS

European Search Report for Application No. 06016448.0, dated Jan. 12, 2007.

International Search Report for International Application No. PCT/CN2006/001802, dated Nov. 16, 2006.

European Search Report for Application No. 06016448.0-2412, dated Mar. 29, 2007.

* cited by examiner

METHOD FOR HANDOFF FROM PACKET SWITCHING DOMAIN TO CIRCUIT SWITCHING DOMAIN AND EQUIPMENT THEREOF

CROSS-REFERENCES TO RELATED APPLICATIONS

This application claims the benefit of Chinese Patent Application No. 200510089836.4, which was filed on Aug. 8, 2005, the entire disclosure of which is hereby incorporated herein by reference.

BACKGROUND OF THE INVENTION

1. Field of the Invention

The present invention relates to a communication network, and particularly to a method for handoff from a Packet Switching domain to a Circuit Switching domain and equipment thereof.

2. Background of the Invention

In case of a Circuit Switching (CS) domain network and a Packet Switching (PS) domain network coexisting, when a Mobile Station (MS) supporting both CS domain communication and PS domain communication moves from the border of the PS network to the border of the CS network, handoff from the PS domain to the CS domain should be performed to maintain the continuity of the service.

In the prior art, there are two methods for handoff from the PS domain to the CS domain, one is to add an A16 interface to a Base Station Controller (BSC) in the current CS network and implement the handoff through the A16 interface.

According to the other method, a handoff entity control layer in the PS domain simulate the original service in the CS domain, specifically, a call in the PS domain is switched to a call in the simulated CS domain at first, and then the call is switched from the handoff entity control layer in the PS domain to the CS domain according to the existing call handoff method of the CS domain.

SUMMARY OF THE INVENTION

The present invention provides a method for handoff from the PS domain to the CS domain and equipment thereof, so that the routing process can be simplified, and the resources can be saved while the cost is reduced.

The present invention is implemented as follows. A method for handoff from a Packet Switched (PS) domain to a Circuit Switched (CS) domain includes: when it is need to handoff from the PS domain to the CS domain, a Mobile Station (MS) obtaining a handoff number and initiating a CS domain session request by taking the handoff number as a called number; an Interworking Gateway (IWGW) associating the CS domain session request to an original session of the MS and notifying the MS to perform an air interface handoff from the PS domain to the CS domain; the MS notifying the IWGW to finish the air interface handoff from the PS domain to the CS domain.

A Circuit Switched (CS) domain Interworking System (IWS) for handoff from a PS domain to a CS domain includes: a CS domain calling signaling processing module for processing signaling from a CS domain calling side, and respectfully connected to a PS domain access network, a CS domain call control entity and a CS domain handoff module; wherein the CS domain handoff module is for processing and forwarding a received CS domain switch signaling, and is connected to the PS domain access network, the CS domain call control entity and the CS domain calling signaling processing module.

A Packet Switched (PS) domain access network includes: a PS domain access module; and a CS domain calling signaling processing module for processing signaling from a CS domain calling side, and is connected to the PS domain access module, a CS domain call control entity and a CS domain handoff module; wherein the CS domain handoff module is for processing and forwarding the received CS domain switch signaling, and which is connected to the PS domain access network, the CS domain call control entity and the CS domain calling signaling processing module.

A Mobile Station (MS) includes: a first session module for processing an original Packet Switched (PS) domain session; a handoff number processing module, is connected to a second session module and is for obtaining a handoff number; the second session module being connected to the handoff number processing module and for initiating a call toward a Circuit Switched (CS) domain network through a PS domain access network according to the handoff number; and a handoff processing module for performing an air interface handoff from the PS domain to the CS domain and for interacting with an Interworking Gateway (IWGW) to make the IWGW finish the air interface handoff from the PS domain to the CS domain.

An Interworking Gateway (IWGW) includes: means for associating a Circuit Switched (CS) domain session request to an original session of a Mobile Station (MS), and finishing a handoff of the MS from a PS domain to a CS domain.

By adopting the technical solution provided by the present invention, it is not necessary to modify network cells in the existing CS domain network which is well established, so that resources can be saved. The routing process is simplified by resetting routing rules. Moreover, it is not necessary for the handoff control layer entity to simulate the original service of the CS domain. There is no new requirement upon the functions of the MGCF, so that the MMCF need not indicate the MGCF to allocate a CIC as the handoff MAP circuit.

DETAILED DESCRIPTION OF THE PREFERRED EMBODIMENTS

To make the object, the technical solution and the advantages of the present invention clearer and more understandable, the present invention will be described in detail hereinafter with reference to embodiments as well as the accompanying drawings.

Figure 1:
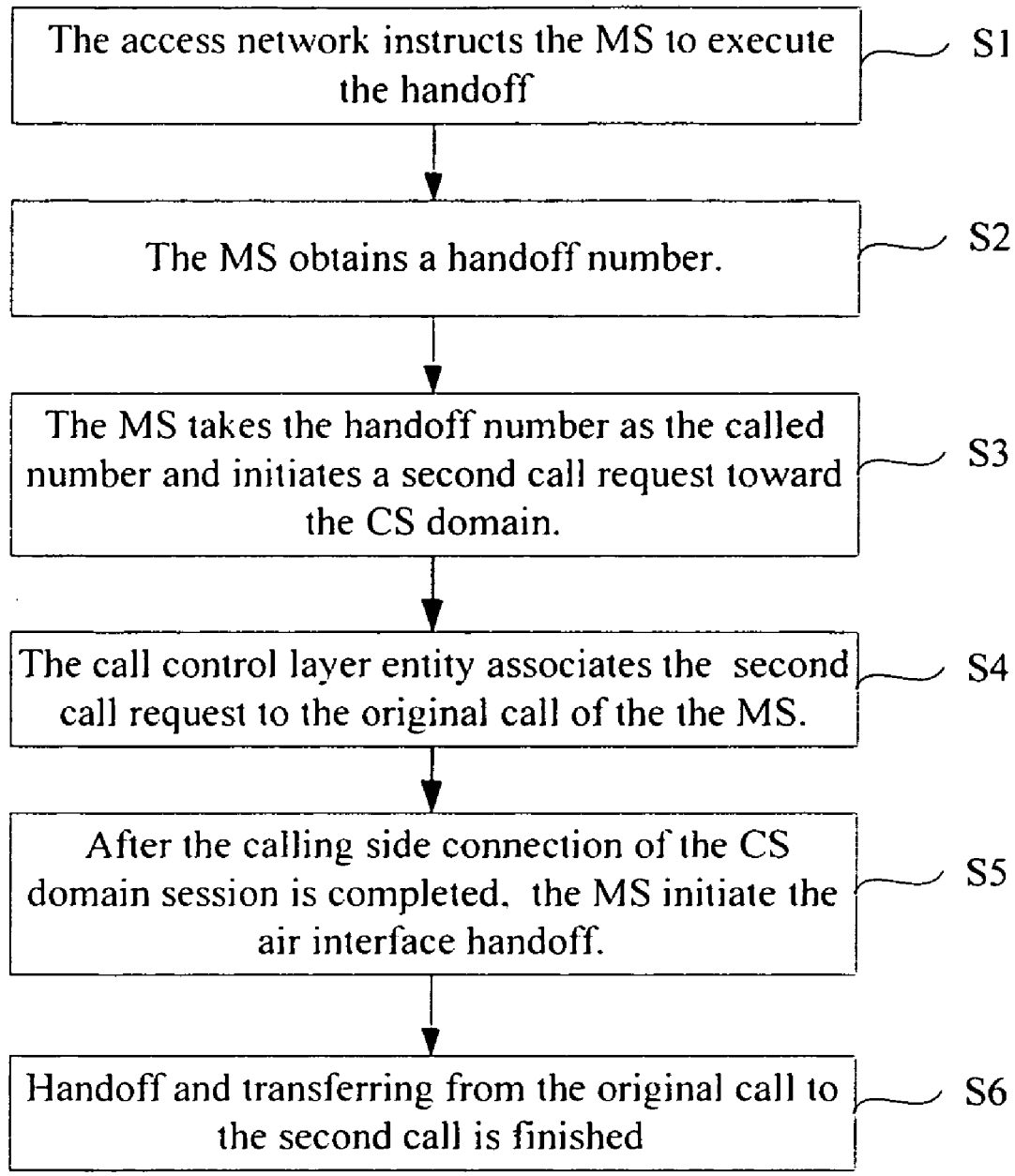
FIG. 1 is a flowchart in accordance with an embodiment of the present invention.

FIG. 1 is a flowchart in accordance with an embodiment of the present invention.

Step S1: an Access network (AN) instructs a Mobile Station (MS) to execute a handoff process.

Step S2: the MS obtains a handoff number.

Step S2 can be implemented through the following three ways:

S2-1: the MS generates the handoff number itself and notifies the network side about the generated handoff number, for instance, the MS can generate the handoff number by converting the Internet Protocol (IP) address to decimal format and adding a special prefix to the converted address.

S2-2: the MS sends an application to the network side, and handoff control layer entity allocates the handoff number to the MS and sends the number to the MS.

S2-3: the handoff number is specified for the MS statically.

Figure 6:
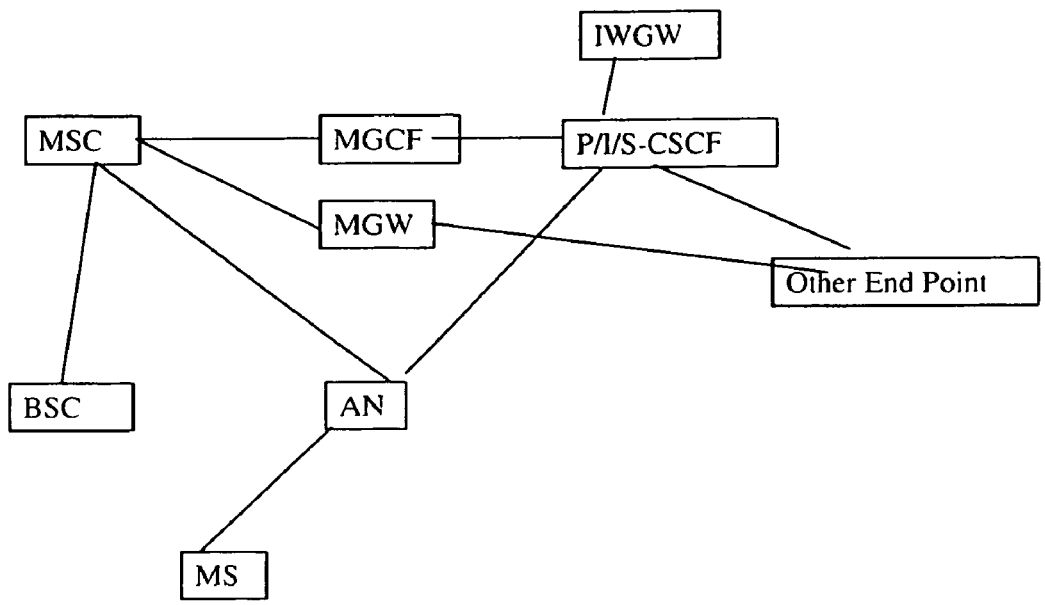
FIG. 6 is a schematic diagram illustrating the network structure when the PS domain directly simulates a CS domain access network in accordance with the embodiment of the present invention.

Step S3 can be implemented through the following two ways:

S3-1: the MS sends an initial call request to the PS domain access network; the PS domain access network directly simulates an interface of the CS domain access network and initiates an initial call request toward the CS domain call control entity such as a Mobile Switching Center (MSC). The specific network structure for implementing this is shown in FIG. 6.

Figure 7:
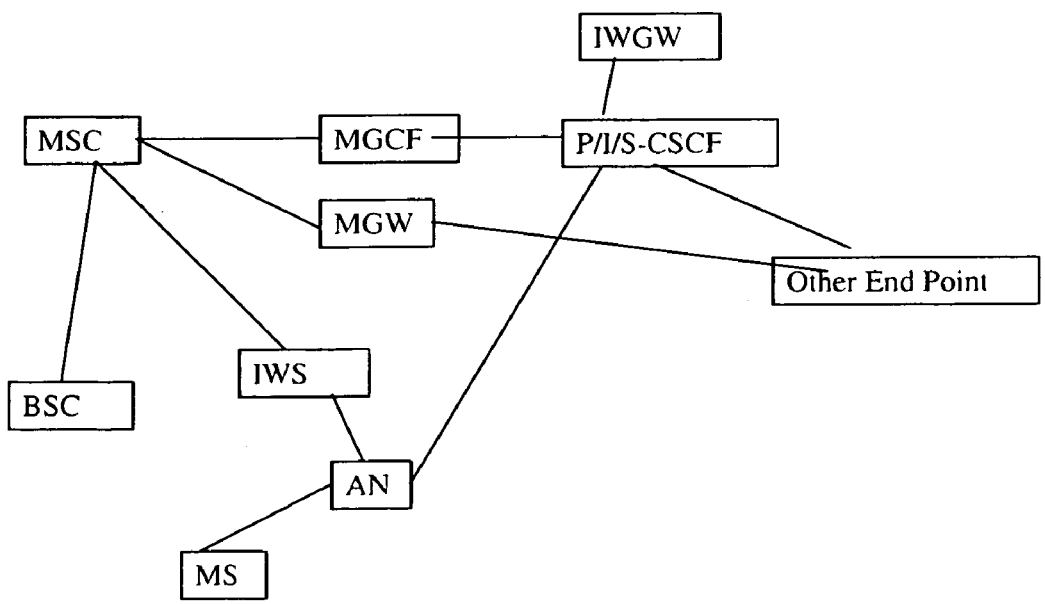
FIG. 7 is a schematic diagram illustrating the network structure when an Interworking System simulates a CS domain access network in accordance with the embodiment of the present invention.

S3-2: the MS sends an initial call request to the Interworking System (IWS); the IWS simulates the CS domain access network and sends the initial call request to the CS domain call control entity. The specific network structure for implementing this is shown in FIG. 7.

Step S4: according to the information in the CS domain session request, the network side associates the call request to the original call of the MS.

Step S4 can be implemented through the following three ways:

S4-1: if the handoff number is allocated by the MS itself, as described in Step S2-1, the MSC will trigger the session request to the handoff control layer entity such as an Interworking Gateway (IWGW) before routing the call. Since the MS generates the handoff number by itself and notifies the network side in Step S2-1, the IWGW will associate the session request to the original call according to the notification sent by the MS and route the session request to the PS domain by replacing the called number with the called number of the original call. Alternatively, the session request can be routed to the PS domain by the MSC directly.

S4-2: if the handoff number is allocated by the network, as described in Step S2-2, the MSC will directly route the session request to the PS domain according to the handoff number; and then a Call Session Control Function (CSCF) in PS domain triggers the call to the handoff control layer entity such as the IWGW; and the session request can be associated to the original call because the called number is allocated by the IWGW.

S4-3: if the handoff number is specified statically in advance, as described in Step S2-3, the MSC will directly route the call to the PS domain; the PS domain network will trigger the call to the handoff control layer entity such as the IWGW and the IWGW will associate the call to the original call according to the called number.

Step S5: after the calling side connection of the CS domain session is completed, the network side sends a handoff command to the MS to notify the MS to perform air interface handoff from the PS domain to the CS domain.

Step S5 can be implemented through the following two ways:

S5-1: corresponding to Step S3-1, after the calling side connection between the PS domain access network and the CS domain call control function (MSC) is completed, the PS domain access network will send a handoff application to the MSC before sending the handoff command to the MS, and then the MS starts the air interface handoff according to the existing handoff mechanism.

S5-2: corresponding to Step S3-2, the CS domain access network is simulated by the IWS. The IWS requests the MS for relevant handoff information after the calling side connection is completed, and then simulates the CS domain access network to send the handoff application to the MSC before sending the handoff command to the MS, and then the MS starts the air interface handoff according to the existing handoff mechanism.

Step S6: the MS notifies the network side to finish the network side handoff from the PS domain to the CS domain.

Step S6 can be implemented through the following two ways:

S6-1: after finishing establishing a destination channel, the network side will send the handoff command to the MS and command the MS to switch to the destination channel; after receiving the handoff command, the MS sends a switch start notification to the handoff control layer entity and then finishes the air interface handoff according to the existing CS domain handoff mechanism; after receiving the switch start notification, the handoff control layer entity connects the CS domain session request with the original session so that network side handoff from the PS domain to the CS domain is finished.

S6-2: after finishing establishing the destination channel, the network side sends a handoff command to the MS and commands the MS to switch to the destination channel; after handoff to the destination channel, the MS notifies the PS domain access network to clear the original link. The MS can send a data packet with a handoff finished notification to the PS domain network at a certain time before Step S5; the PS domain access network and the network entity simulating the CS domain access network store the data packet and wait for the command of clearing the original link; when the PS domain access network or the network entity simulating the CS domain access network receives the command of clearing the original link, the data packet will be forwarded to the handoff control layer entity; the handoff control layer entity will connect the original session to the CS domain session request so that the network side handoff from the PS domain to the CS domain is finished.

FIG. 2 to FIG. 5 are schematic diagrams illustrating the network states when steps in FIG. 1 are executed. In FIG. 2 to FIG. 5, a bold line denotes a contents interaction while a thin line denotes a signaling interaction. The contents hereby mean corresponding contents between two communicating parts. For instance, the contents are voices on telephone calls; the signaling interaction is used for establishing a logic connection for bearing the content interaction. It is supposed that the remote node communicating with the MS that needs handoff are located in the PS domain. Besides, the gateway connecting the PS domain and the CS domain includes an MGW and an MGCF as shown in FIG. 6 and FIG. 7, while the MGW is a content gateway connecting the PS domain and the CS domain, and the MGCF is a signaling gateway connecting the PS domain and the CS domain.

Figure 2:
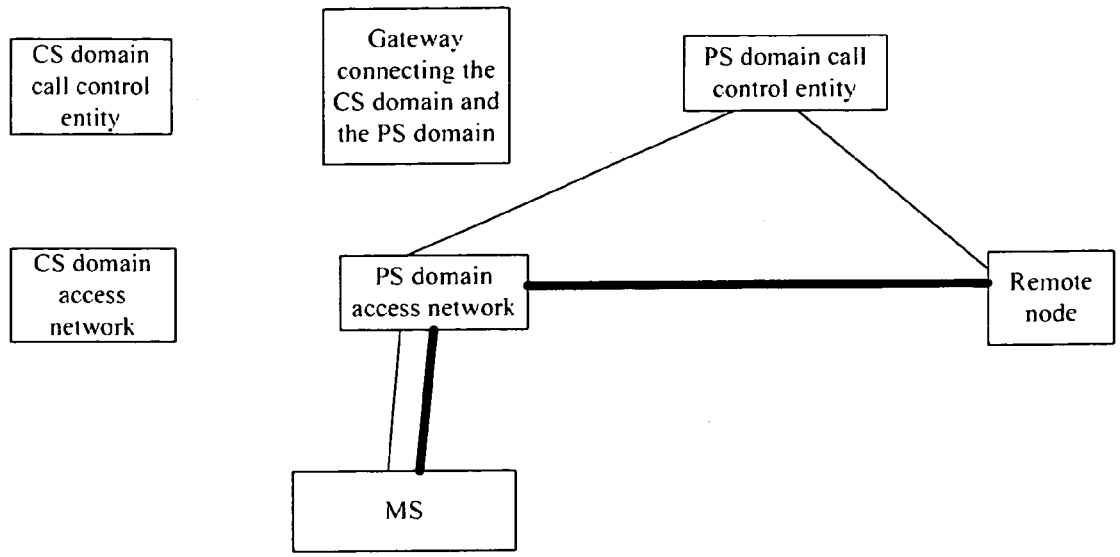
FIG. 2 is a schematic diagram illustrating the state before handoff from the PS domain to the CS domain in accordance with the embodiment of the present invention.

Before the handoff is started, the network state is shown in FIG. 2, it can be seen that the MS to be switched only performs the content interaction with the remote node through the PS domain access network. The MS performs the signaling interaction with the PS domain access network to establish the logic connection for bearing the content interaction between the MS and the PS domain access network; the PS domain call control entity performs the signaling interaction with the remote node as well as the PS domain access network to establish the logic connection for bearing the content interaction between the remote node and the PS domain access network.

Figure 3:
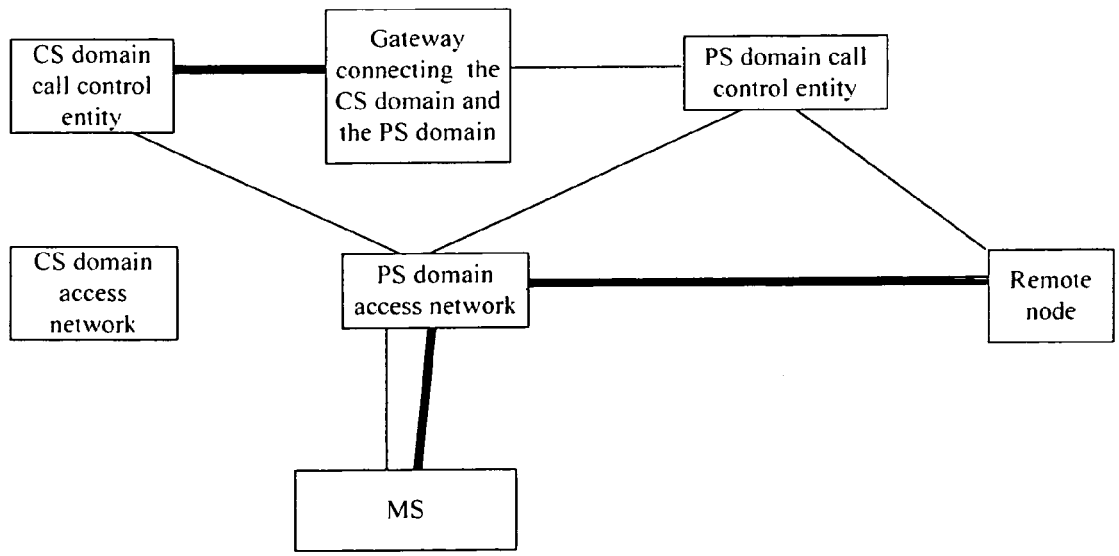
FIG. 3 is a schematic diagram illustrating the state of establishing a CS domain call in accordance with the embodiment of the present invention.

After the handoff is started, firstly, a logic connection for bearing the content interaction is established between the gateway connecting the PS domain and the CS domain and the CS domain call control entity, as shown in FIG. 3. The CS domain call control entity interacts with the PS domain access network to send a call request to the gateway connecting the PS domain and the CS domain. The gateway connecting the PS domain and the CS domain performs the signaling interaction with the PS call control entity, and sends to the CS domain call control entity a response of the call request. Thus the logic connection for bearing the content interaction is established between the CS domain call control entity and the gateway connecting the CS domain and the PS domain. It should be noted that only a logic connection for bearing the content interaction is established without any actual content being transferred.

Figure 4:
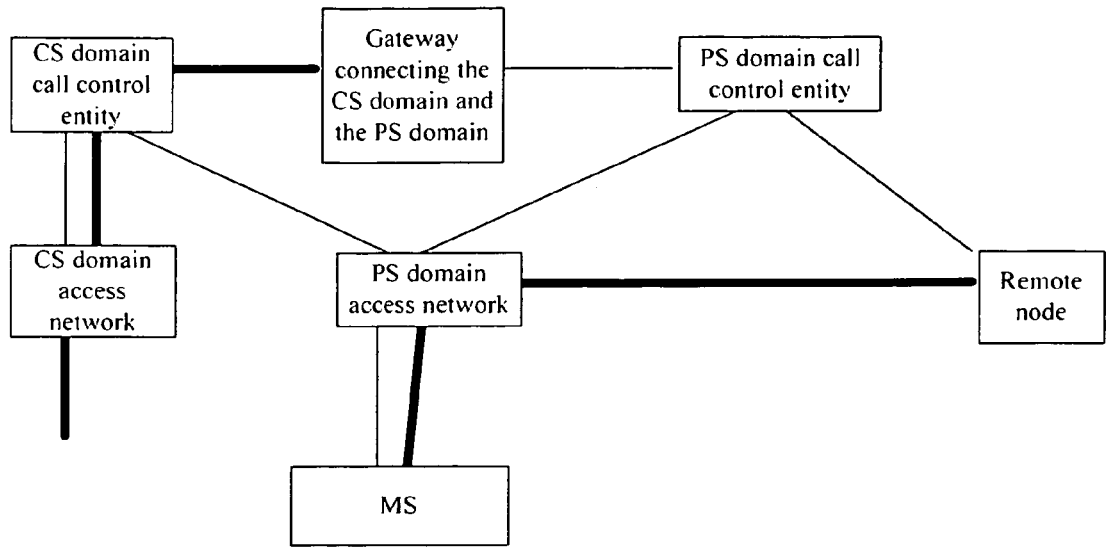
FIG. 4 is a schematic diagram illustrating the state after the CS domain handoff channel is established in accordance with the embodiment of the present invention.

Then the CS domain call control entity interacts with the CS domain access network so that the CS domain access network finishes the calling side connection of the CS domain session, as shown in FIG. 4. It should be noted that only a logic connection for bearing the content interaction is established without any actual content being transferred.

Figure 5:
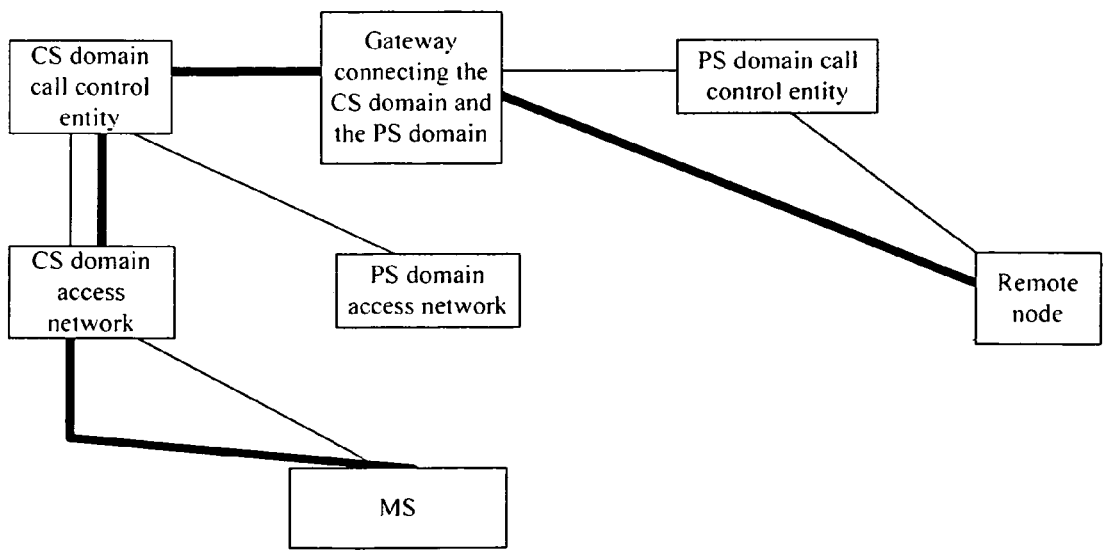
FIG. 5 is a schematic diagram illustrating the state after handoff from the PS domain to the CS domain in accordance with the embodiment of the present invention.

The network schematic diagram after the handoff is shown in FIG. 5. The PS domain call control entity interacts with the remote node as well as the gateway connecting the PS domain and the CS domain. Since the MS has switched to the CS domain, there is no more signaling interaction between the MS and the PS domain access network; similarly, there is no more signaling interaction between the PS domain access network and the PS domain call control entity. It can be seen that, after the handoff is finished, the MS does not communicate with the remote nodes through the PS domain access network any longer, but performs the content interaction with the remote nodes located in the PS domain through the CS domain access network, the CS domain call control entity and the gateway connecting the PS domain and CS domain in turn.

Several specific embodiments can be obtained by combining the aforesaid implementing ways in each step. The method in accordance with the present invention will be illustrated hereinafter with reference to five embodiments.

Figure 8:
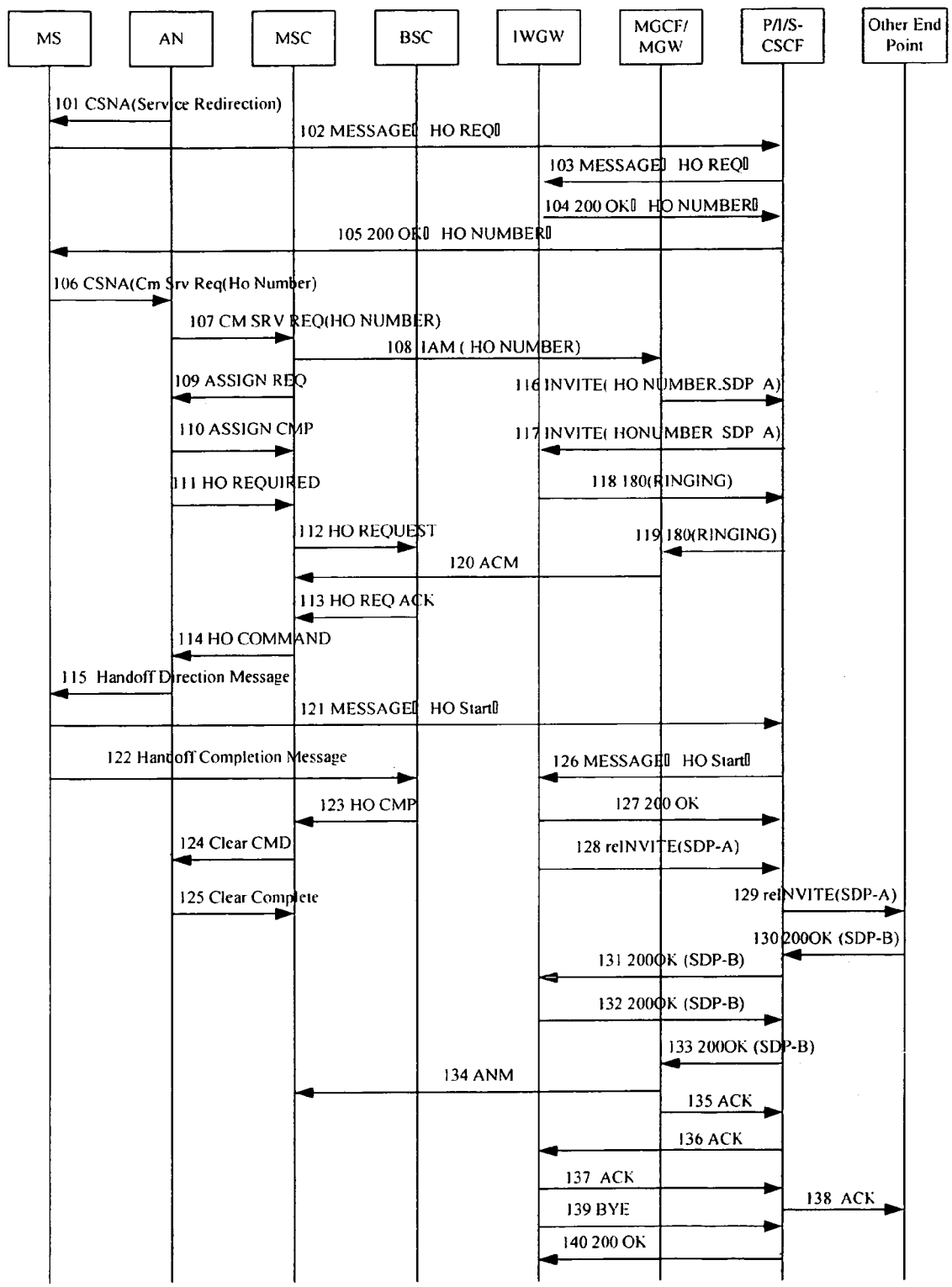
FIG. 8 is a signaling flowchart in accordance with the first embodiment of the present invention.

Embodiment 1: with reference to FIG. 8. In this embodiment, the network side allocates the handoff number. When the air interface handoff start, the network side sends a handoff start notification to the network to finish the handoff from the PS domain to the CS domain, the embodiment comprises the following steps:

Determining that the MS should be switched to the CS domain, the AN sends a CSNA message to the MS to command the MS to execute the handoff.

102. The MS sends a 'Message' SIP message to the Proxy/Interrogating/Serving CSCF (P/I/S-CSCF) to notify the PS network that the MS is going to execute the handoff process.

103. The P/I/S-CSCF is triggered to forward this 'Message' SIP message to the IWGW according to iFC rules.

104. The IWGW returns a SIP message '200 OK' that comprises a special handoff number Handoff Number to the P/I/S-CSCF.

105. The P/I/S-CSCF forwards this SIP message '200 OK' to the MS.

106. As a response to the first CSNA message, the MS initiates a call by sending a CSNA message that comprises "Origination" contents.

107. The AN constructs a CM service request message concerning the CSNA (Origination) message and sends the CM service request message to the MSC in the CS domain.

As mentioned above, in Step S3, the MS can send an initial call request to the CS domain access network simulating entity, i.e. the IWS; the IWS simulates the CS access network and sends the initial call request to the CS domain call control entity, i.e. the MSC. As to this situation, step 107 should be modified as follows: The AN forwards the CSNA message received in step 106 to the IWS. The IWS constructs the CM service request message concerning the CSNA (Origination) message and forwards the CM service request message to the MSC in the CS domain.

108. The MSC initiates an outgoing call to the MGCF, wherein the called number is the special handoff number as a Handoff Number.

109. The MSC sends an assignment message to the AN while step 108 is being executed.

When there is an IWS, the MSC will send the assignment message to the IWS.

110. On receiving the assignment message, the AN just returns an assignment complete message without establishing any air channel.

When there is an IWS, step 110 should be modified as follows:

On receiving the assignment message, the IWS just returns an assignment complete message without establishing any air channel.

111. The AN sends a Handoff Required message to initiate a CS domain handoff process.

When there is an IWS, step 111 should be modified as follows:

The IWS sends a Handoff Required message to initiate the CS domain handoff process.

112. to 115 are steps in the existing CS domain handoff process.

When there is an IWS, in step 114, the MSC will send an HO COMMAND message to the IWS. After receiving the HO COMMAND message, the IWS constructs a Handoff Direction Message according to the received message and then sends the Handoff Direction Message to the AN; in step 115, the AN forwards the received Handoff Direction Message to the MS.

116. The MGCF sends a SIP message 'INVITE' with the handoff number and a content of SDP-A to the S-CSCF.

117. The S-CSCF forwards this SIP message 'INVITE' to the IWGW.

118. The IWGW confirms the handoff number that is allocated by the IWGW itself and is brought by the SIP message 'INVITE', finds out the existing session corresponding to the handoff number, and then returns a SIP message '180' that without a content of SDP to the S-CSCF.

119. The S-CSCF forwards this SIP message '180' to the MGCF.

120. As a response to step 108, the MGCF sends an ACM message of ISUP to the MSC.

121. On receiving the handoff indication message, the MS will send a SIP message 'MESSAGE' to notify the P/I/S-CSCF that the air interface handoff is to start.

122 to 125 illustrate the air interface handoff process after the existing CS domain handoff process.

126. The P/I/S-CSCF forwards the received SIP message 'MESSAGE' to the IWGW.

127. The IWGW sends a SIP message '200 OK' to the P/I/S-CSCF as a response to the SIP message 'MESSAGE'.

128. The IWGW sends a SIP message 'reINVITE' with a content of SDP-A to the S-CSCF.

129. The S-CSCF forwards the message to the remote node and the remote node replaces the recorded content SDP with SDP-A.

130. The remote node returns a content of SDP-B, which may be different from the SDP content in the previous session, to the IWGW by sending a SIP message '200 OK' to the S-CSCF.

131. The S-CSCF forwards this SIP message '200 OK' to the IWGW.

132. The IWGW sends a SIP message '200 OK' with a content of SDP-B to the S-CSCF so as to terminate the session started in step 117.

133. The S-CSCF forwards this SIP message '200 OK' to the MGCF.

134. The MGCF sends an ANM message to the MSC so as to complete the CS domain session.

135. The MGCF sends a SIP message 'ACK' to the S-CSCF.

136. The S-CSCF forwards the SIP message 'ACK' to the IWGW.

137. The IWGW sends a SIP message 'ACK' to the S-CSCF.

138. The S-CSCF forwards the SIP message 'ACK' to the remote node.

139. The IWGW sends a SIP:BYE message to the P/I/S-CSCF so as to initiate a releasing process of the original call.

140. The P/I/S-CSCF returns a SIP:200 OK message to the IWGW to complete removing the call.

With reference to FIG. 1, Step S1 thereof is completed by step 101 in the present embodiment;

Step S2 in FIG. 1 is completed by steps 102 to 105 in the present embodiment;

Step S3 in FIG. 1 is completed by steps 106, 107, 109 and 110 in the present embodiment;

Step S4 in FIG. 1 is completed by step 108 as well as steps 116 to 120 in the present embodiment;

Step S5 in FIG. 1 is completed by steps 111 to 115 as well as steps 122 to 125 in the present embodiment;

Step S6 in FIG. 1 is completed by step 121 as well as steps 126 to 140 in the present embodiment.

Figure 9:
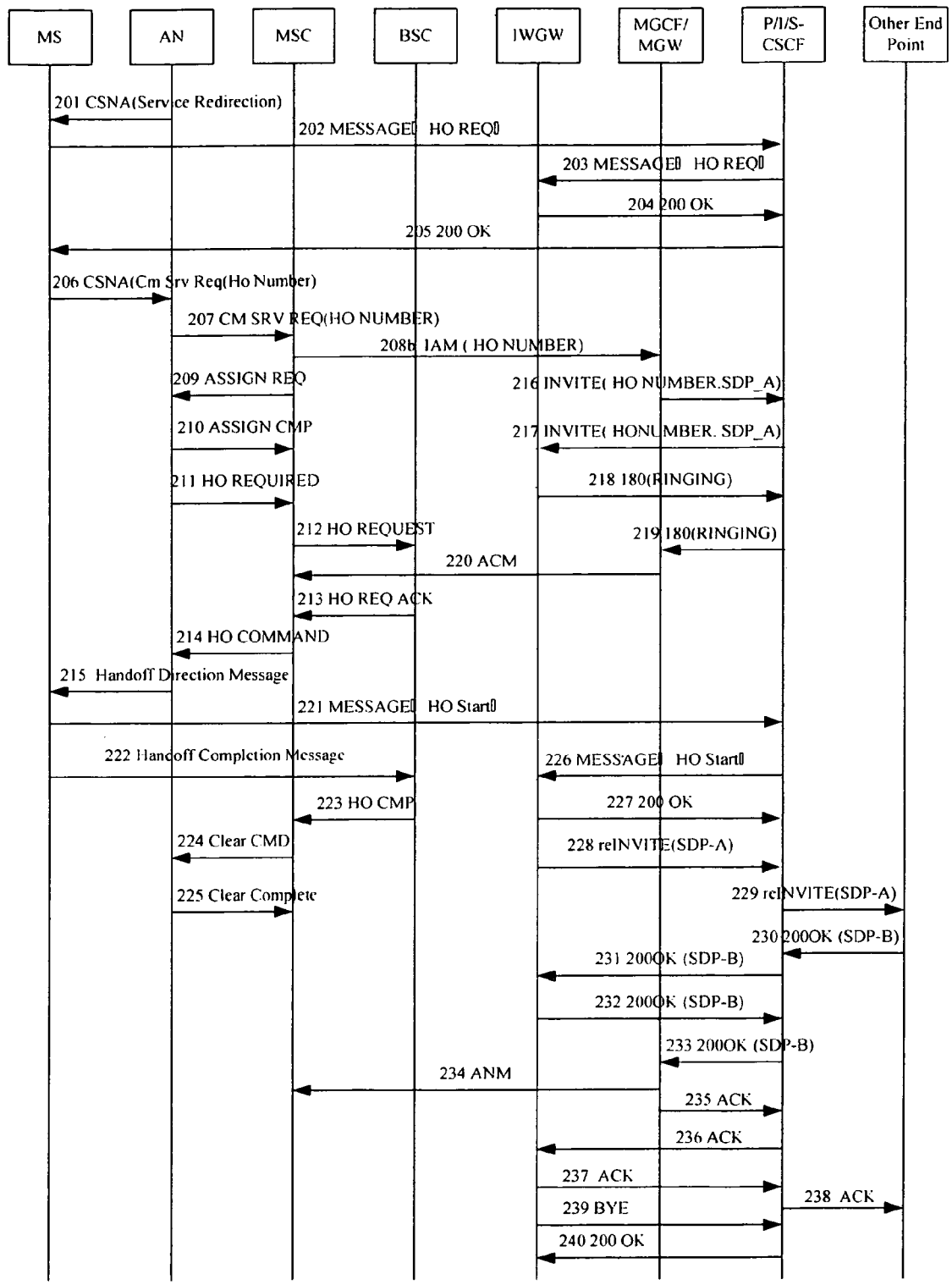
FIG. 9 is a signaling flowchart in accordance with the second embodiment of the present invention.

Embodiment 2: with reference to FIG. 9.

In this embodiment, the handoff number is allocated for the MS statically to implement the handoff from the PS domain to the CS domain, this embodiment comprises the following steps:

201. Determining that the MS should be switched to the CS domain, the AN sends a CSNA message to the MS to command the MS to execute the handoff.

202. The MS sends a 'Message' SIP message to the P/I/S-CSCF, and the following step 202 to step 204 are optional.

203. The P/I/S-CSCF is triggered to forward this 'Message' SIP message to the IWGW according to iFC rules.

204: The IWGW records the handoff event and returns a SIP message '200 OK'.

205. The P/I/S-CSCF forwards this SIP message '200 OK' to the MS.

206. As a response to the first CSNA message, the MS initiates a call by sending a CSNA message that comprises "Origination" contents. This step can be executed together with step 202.

207. The AN constructs a CM service request message concerning the CSNA (Origination) message and sends the CM service request message to the MSC in the CS domain.

As mentioned above, in Step S3, the MS can send an initial call request to the CS domain access network simulating entity, i.e. the IWS; the IWS simulates the CS access network and sends the initial call request to the CS domain call control entity, i.e. the MSC. As to this situation, step 207 should be modified as follows:

The AN forwards the CSNA message received in step 206 to the IWS. The IWS constructs the CM service request message concerning the CSNA (Origination) message and forwards the CM service request message to the MSC in the CS domain.

208. The MSC initiates an outgoing call to the MGCF, wherein the called number is the special handoff number as a Handoff Number.

209. The MSC sends an assignment message to the AN while step 208 is being executed.

When there is an IWS, the MSC will send the assignment message to the IWS.

210. On receiving the assignment message, the AN just returns an assignment complete message without establishing any air channel.

When there is an IWS, step 210 should be modified as follows:

On receiving the assignment message, the IWS just returns an assignment complete message without establishing any air channel.

211. The AN sends a Handoff Required message to initiate a CS domain handoff process.

When there is an IWS, step 211 should be modified as follows:

The IWS sends a Handoff Required message to initiate the CS domain handoff process.

212 to 215 are steps in the existing CS domain handoff process.

When there is an IWS, in step 214, the MSC will send an HO COMMAND message to the IWS. After receiving the HO COMMAND message, the IWS constructs a Handoff Direction Message according to the received message and then sends the Handoff Direction Message to the AN; in step 215, the AN forwards the received Handoff Direction Message to the MS.

216. The MGCF sends a SIP message 'INVITE' with the handoff number and a content of SDP-A to the S-CSCF.

217. The S-CSCF forwards this SIP message 'INVITE' to the IWGW.

218. The IWGW confirms the handoff number that is allocated by the IWGW itself and is brought by the SIP message 'INVITE', finds out the existing session corresponding to the handoff number, and then returns a SIP message '180' that without a content of SDP to the S-CSCF.

219. The S-CSCF forwards this SIP message '180' to the MGCF.

220. As a response to step 208, the MGCF sends an ACM message of ISUP to the MSC.

221. On receiving the handoff indication message, the MS will send a SIP message 'MESSAGE' to notify the P/I/S-CSCF that the air interface handoff is to start.

222 to 225 illustrate the air interface handoff process after the existing CS domain handoff process.

226. The P/I/S-CSCF forwards the received SIP message 'MESSAGE' to the IWGW.

227. The IWGW sends a SIP message '200 OK' to the P/I/S-CSCF as a response to the SIP message 'MESSAGE'.

228. The IWGW sends a SIP message 'reINVITE' with a content of SDP-A to the S-CSCF.

229. The S-CSCF forwards the message to the remote node and the remote node replaces the recorded content SDP with SDP-A.

230. The remote node returns a content of SDP-B, which may be different from the SDP content in the previous session, to the IWGW by sending a SIP message '200 OK' to the S-CSCF.

231. The S-CSCF forwards this SIP message '200 OK' to the IWGW.

232. The IWGW sends a SIP message '200 OK' with a content of SDP-B to the S-CSCF so as to terminate the session started in step 217.

233. The S-CSCF forwards this SIP message '200 OK' to the MGCF.

234. The MGCF sends an ANM message to the MSC so as to complete the CS domain session.

235. The MGCF sends a SIP message 'ACK' to the S-CSCF.

236. The S-CSCF forwards the SIP message 'ACK' to the IWGW.

237. The IWGW sends a SIP message 'ACK' to the S-CSCF.

238. The S-CSCF forwards the SIP message 'ACK' to the remote node.

239. The IWGW sends a SIP:BYE message to the P/I/S-CSCF so as to initiate a releasing process of the original call.

240. The P/I/S-CSCF returns a SIP:200 OK message to the IWGW to complete removing the call.

With reference to FIG. 1, Step S1 thereof is completed by step 201 in the present embodiment;

Step S2 in FIG. 1 is completed by steps 202 to 205 in the present embodiment;

Step S3 in FIG. 1 is completed by steps 206, 207, 209 and 210 in the present embodiment;

Step S4 in FIG. 1 is completed by step 208 as well as steps 216 to 220 in the present embodiment;

Step S5 in FIG. 1 is completed by steps 211 to 215 as well as steps 222 to 225 in the present embodiment;

Step S6 in FIG. 1 is completed by step 221 as well as steps 226 to 240 in the present embodiment.

Figure 10:
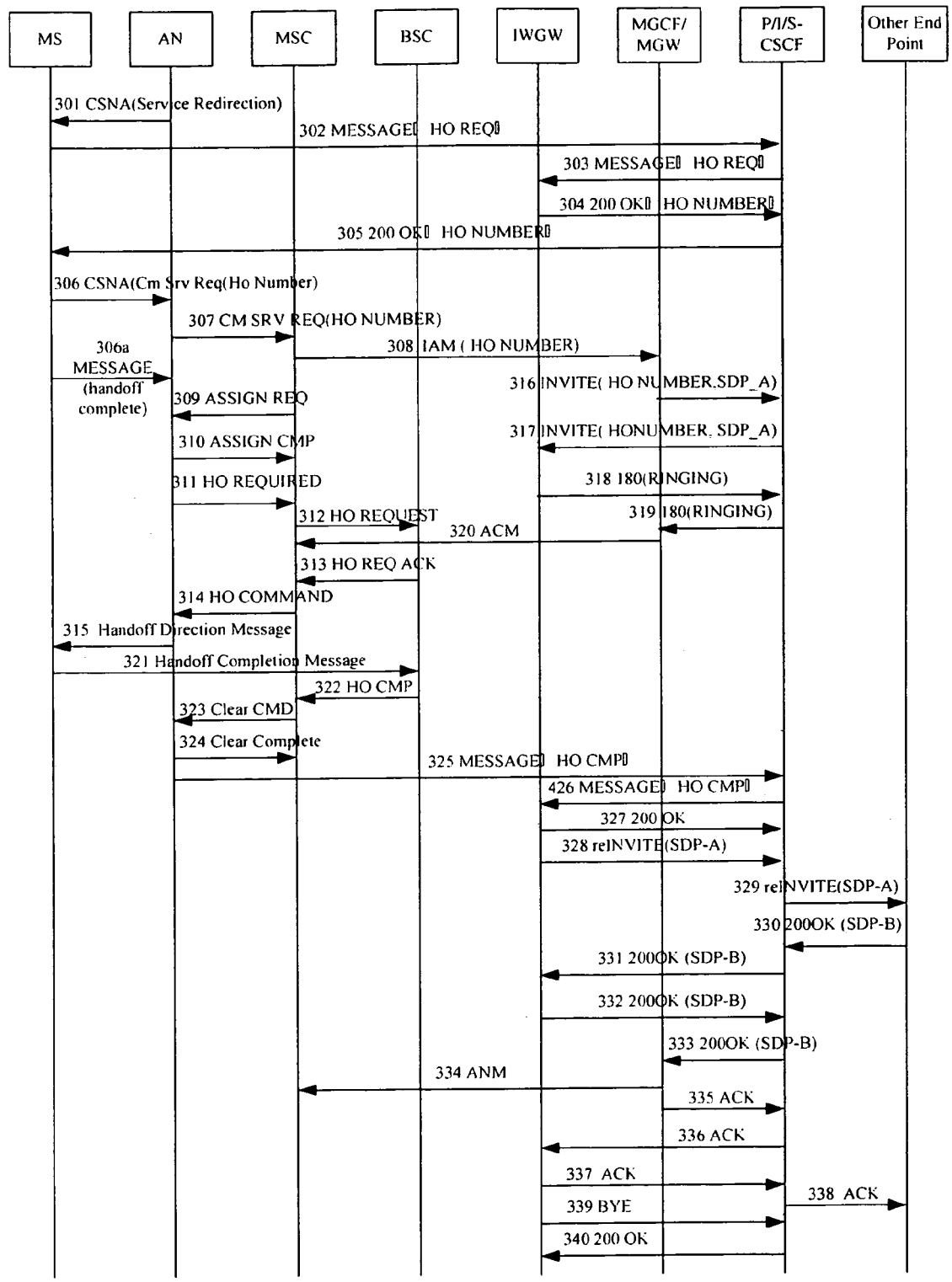
FIG. 10 is a signaling flowchart in accordance with the third embodiment of the present invention.

Embodiment 3: with reference to FIG. 10.

In this embodiment, the network side allocates the handoff number, and the PS domain access network stores and forwards the handoff complete notification, and thereby handoff from PS to CS is finished. This embodiment comprises the following steps:

301. Determining that the MS should be switched to the CS domain, the AN sends a CSNA message to the MS to command the MS to execute the handoff.

302. The MS sends a 'Message' SIP message to the Proxy/Interrogating/Serving CSCF (P/I/S-CSCF) to notify the PS network that the MS is going to execute the handoff process.

303. The P/I/S-CSCF is triggered to forward this 'Message' SIP message to the IWGW according to iFC rules.

304: The IWGW returns a SIP message '200 OK' that comprises a special handoff number Handoff Number to the P/I/S-CSCF.

305. The P/I/S-CSCF forwards this SIP message '200 OK' to the MS.

306. As a response to the first CSNA message, the MS initiates a call by sending a CSNA message that comprises "Origination" contents.

306a. The MS constructs a SIP message 'MESSAGE' that comprises the handoff complete indication and sends the message to the AN; the AN stores the message and waits for the clear command message from the MSC.

307. The AN constructs a CM service request message concerning the CSNA (Origination) message and sends the CM service request message to the MSC in the CS domain.

As mentioned above, in Step S3, the MS can send an initial call request to the CS domain access network simulating entity, i.e. the IWS; the IWS simulates the CS access network and sends the initial call request to the CS domain call control entity, i.e. the MSC. As to this situation, step 307 should be modified as follows:

The AN forwards the CSNA message received in step 306 to the IWS. The IWS constructs the CM service request message concerning the CSNA (Origination) message and forwards the CM service request to the MSC in the CS domain.

308. The MSC initiates an outgoing call to the MGCF, wherein the called number is the special handoff number as a Handoff Number.

309. The MSC sends an assignment message to the AN while step 308 is being executed.

When there is an IWS, the MSC will send the assignment message to the IWS.

310. On receiving the assignment message, the AN just returns an assignment complete message without establishing any air channel.

When there is an IWS, step 310 should be modified as follows:

On receiving the assignment message, the IWS just returns an assignment complete message without establishing any air channel.

311. The AN sends a Handoff Required message to initiate a CS domain handoff process.

When there is an IWS, step 311 should be modified as follows:

The IWS sends a Handoff Required message to initiate the CS domain handoff process.

312 to 315 are steps in the existing CS domain handoff process.

When there is an IWS, in step 314, the MSC will send an HO COMMAND message to the IWS. After receiving the HO COMMAND message, the IWS constructs a Handoff Direction Message according to the received message and then sends the Handoff Direction Message to the AN; in step 315, the AN forwards the received Handoff Direction Message to the MS.

316. The MGCF sends a SIP message 'INVITE' with the handoff number and a content of SDP-A to the S-CSCF.

317. The S-CSCF forwards this SIP message 'INVITE' to the IWGW.

318. The IWGW confirms the handoff number that is allocated by the IWGW itself and is brought by the SIP message 'INVITE', finds out the existing session corresponding to the handoff number, and then returns a SIP message '180' that without a content of SDP to the S-CSCF.

319. The S-CSCF forwards this SIP message '180' to the MGCF.

320. As a response to step 308, the MGCF sends an ACM message of ISUP to the MSC.

321 to 324. The MS starts the air interface handoff process to complete the subsequent handoff process in steps 312 to 315.

325. On receiving the CLEAR COMMAND message, the AN forwards the SIP message 'MESSAGE' which is stored in step 306a and is used to inform the P/I/S-CSCF that the air interface handoff has finished.

326. The P/I/S-CSCF forwards the received SIP message 'MESSAGE' to the IWGW.

327. The IWGW sends a SIP message '200 OK' to the P/I/S-CSCF as a response to the SIP message 'MESSAGE'.

328. The IWGW sends a SIP message 'reINVITE' with a content of SDP-A to the S-CSCF.

329. The S-CSCF forwards the message to the remote node and the remote node replaces the recorded content SDP with SDP-A.

330. The remote node returns a content of SDP-B, which may be different from the SDP content in the previous session, to the IWGW by sending a SIP message '200 OK' to the S-CSCF.

331. The S-CSCF forwards this SIP message '200 OK' to the IWGW.

332. The IWGW sends a SIP message '200 OK' with a content of SDP-B to the S-CSCF so as to terminate the session started in step 317.

333. The S-CSCF forwards this SIP message '200 OK' to the MGCF.

334. The MGCF sends an ANM message to the MSC so as to complete the CS domain session.

335. The MGCF sends a SIP message 'ACK' to the S-CSCF.

336. The S-CSCF forwards the SIP message 'ACK' to the IWGW.

337. The IWGW sends a SIP message 'ACK' to the S-CSCF.

338. The S-CSCF forwards the SIP message 'ACK' to the remote node.

339. The IWGW sends a SIP:BYE message to the P/I/S-CSCF so as to initiate a releasing process of the original call.

340. The P/I/S-CSCF returns a SIP:200OK message to the IWGW to complete removing the call.

With reference to FIG. 1, Step S1 thereof is completed by step 301 in the present embodiment;

Step S2 in FIG. 1 is completed by steps 302 to 305 in the present embodiment;

Step S3 in FIG. 1 is completed by steps 306, 307, 309 and 310 in the present embodiment;

Step S4 in FIG. 1 is completed by step 308 as well as steps 316 to 320 in the present embodiment;

Step S5 in FIG. 1 is completed by steps 311 to 315 as well as steps 321 to 324 in the present embodiment;

Step S6 in FIG. 1 is completed by step 306a as well as steps 325 to 340 in the present embodiment.

Figure 11:
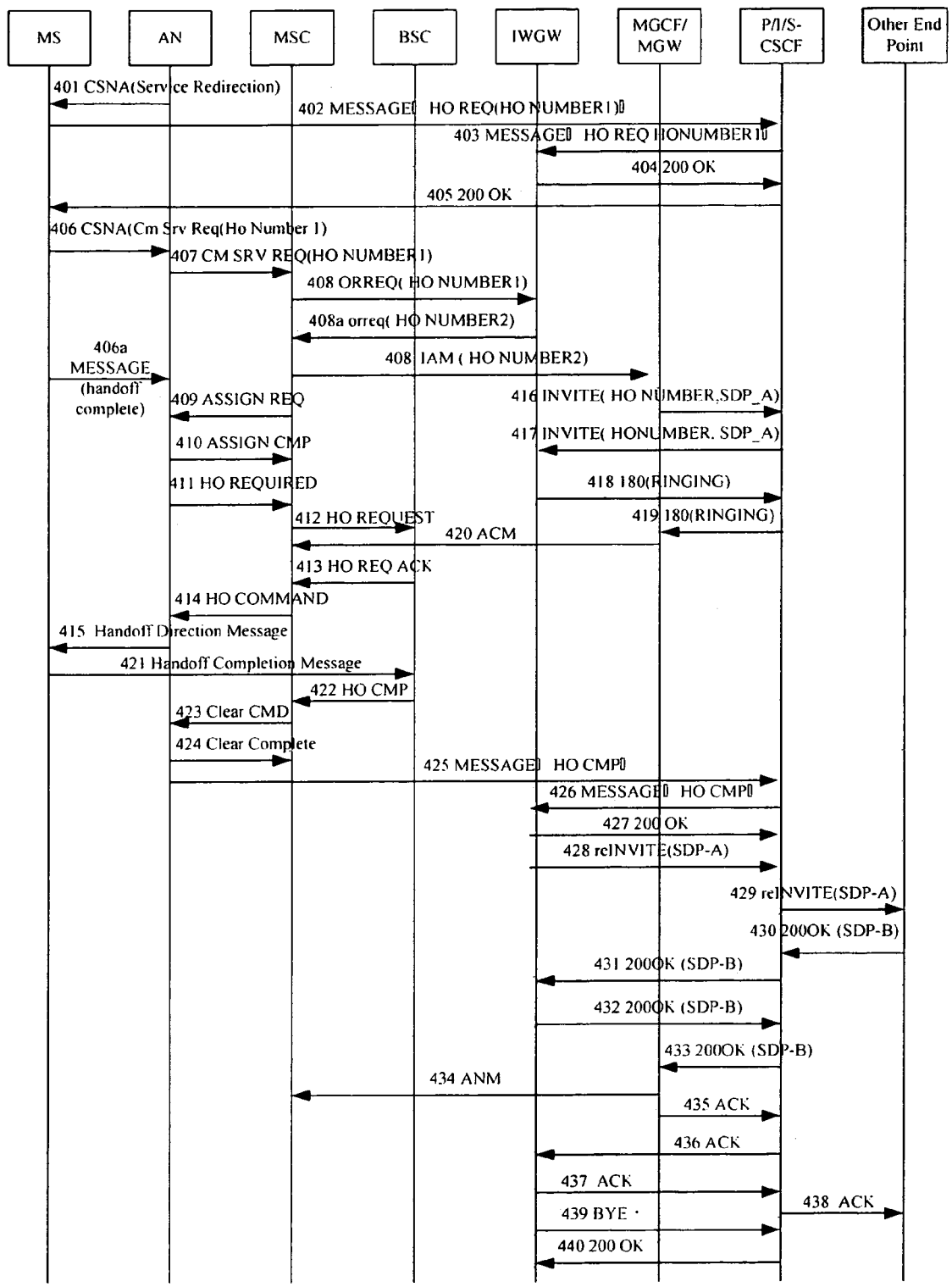
FIG. 11 is a signaling flowchart in accordance with the fourth embodiment of the present invention.

Embodiment 4: with reference to FIG. 11.

In this embodiment, the MS generates the handoff number and the network side initiates the process of clearing the original call, and then handoff from the PS domain to the CS domain is finished, the embodiment comprises the following steps:

401. Determining that the MS should be switched to the CS domain, the AN sends a CSNA message to the MS to command the MS to execute the handoff.

402. The MS generates the handoff number HO number1 and sends the handoff number to the P/I/S-CSCF through a SIP message 'MESSAGE' so as to notify the PS domain network that the handoff is to start. The handoff number can be generated by converting the IP address to the decimal format and adding a special field to the converted address.

403. The P/I/S-CSCF is triggered to forward this 'Message' SIP message to the IWGW according to iFC rules.

404: The IWGW returns a SIP message '200 OK' to the P/I/S-CSCF.

405. The P/I/S-CSCF forwards this SIP message '200 OK' to the MS.

406. As a response to the first CSNA message, the MS initiates a call by sending a CSNA message that comprises "Origination" contents, wherein the called number is HO number1. This step can be executed together with step 402.

406a. The MS constructs a SIP message 'MESSAGE' that comprises a handoff complete indication and sends the message to the AN; the AN stores the message and waits for the CLEAR COMMAND message from the MSC.

407. The AN constructs a CM service request message concerning the CSNA (Origination) message and sends the CM service request message to the MSC in the CS domain.

As mentioned above, in Step S3, the MS can send an initial call request to the CS domain access network simulating entity, i.e. the IWS; the IWS simulates the CS access network and sends the initial call request to the CS domain call control entity, i.e. the MSC. As to this situation, step 407 should be modified as follows:

The AN forwards the CSNA message received in step 406 to the IWS. The IWS constructs the CM service request message concerning the CSNA (Origination) message and forwards the CM service request message to the MSC in the CS domain.

408. The MSC initiates an outgoing call to the MGCF, wherein the called number is the special handoff number as a Handoff Number.

408a. The IWGW finds out the existing session corresponding to HO number1 and returns HO number2 by sending an MAP response message 'orreq' to the MSC.

408b. the MSC initiates an outgoing call to the MGCF, wherein the called number is Handoff number2.

409. The MSC sends an assignment message to the AN while step 408 is being executed.

When there is an IWS, the MSC will send the assignment message to the IWS.

410. On receiving the assignment message, the AN just returns an assignment complete message without establishing any air channel.

When there is an IWS, step 410 should be modified as follows:

On receiving the assignment message, the IWS just returns an assignment complete message without establishing any air channel.

411. The AN sends a Handoff Required message to initiate a CS domain handoff process.

When there is an IWS, step 411 should be modified as follows:

The IWS sends a Handoff Required message to initiate the CS domain handoff process.

412 to 415 are steps in the existing CS domain handoff process.

When there is an IWS, in step 414, the MSC will send an HO COMMAND message to the IWS. After receiving the HO COMMAND message, the IWS constructs a Handoff Direction Message according to the received message and then sends the Handoff Direction Message to the AN; in step 415, the AN forwards the received Handoff Direction Message to the MS.

416. The MGCF sends a SIP message 'INVITE' with the handoff number HO number2 and a content of SDP-A to the S-CSCF.

417. The S-CSCF forwards this SIP message 'INVITE' to the IWGW.

418. The IWGW confirms the handoff number Handoff number2 that is allocated by the IWGW itself and is brought by the SIP message 'INVITE', finds out the existing session corresponding to the handoff number, and then returns a SIP message '180' without a content of SDP to the S-CSCF.

419. The S-CSCF forwards this SIP message '180' to the MGCF.

420. As a response to step 408, the MGCF sends an ACM message of ISUP to the MSC.

421 to 424. The MS starts the air interface handoff process to complete the subsequent handoff process in steps 412 to 415.

425. On receiving the CLEAR COMMAND message, the AN forwards the SIP message 'MESSAGE' which is stored in step 406a and is used to inform the P/I/S-CSCF that the air interface handoff has finished.

426. The P/I/S-CSCF forwards the received SIP message 'MESSAGE' to the IWGW.

427. The IWGW sends a SIP message '200 OK' to the P/I/S-CSCF as a response to the SIP message 'MESSAGE'.

428. The IWGW sends a SIP message 'reINVITE' with a content of SDP-A to the S-CSCF.

429. The S-CSCF forwards the message to the remote node and the remote node replaces the recorded content SDP with SDP-A.

430. The remote node returns a content of SDP-B, which may be different from the SDP content in the previous session, to the IWGW by sending a SIP message '200 OK' to the S-CSCF.

431. The S-CSCF forwards this SIP message '200 OK' to the IWGW.

432. The IWGW sends a SIP message '200 OK' with a content of SDP-B to the S-CSCF so as to terminate the session started in step 417.

433. The S-CSCF forwards this SIP message '200 OK' to the MGCF.

434. The MGCF sends an ANM message to the MSC so as to complete the CS domain session.

435. The MGCF sends a SIP message 'ACK' to the S-CSCF.

436. The S-CSCF forwards the SIP message 'ACK' to the IWGW.

437. The IWGW sends a SIP message 'ACK' to the S-CSCF.

438. The S-CSCF forwards the SIP message 'ACK' to the remote node.

439. The IWGW sends a SIP:BYE message to the P/I/S-CSCF so as to initiate a releasing process of the original call.

440. The P/I/S-CSCF returns a SIP:200 OK message to the IWGW to complete removing the call.

With reference to FIG. 1, Step S1 thereof is completed by step 401 in the present embodiment;

Step S2 in FIG. 1 is completed by steps 402 to 405 in the present embodiment;

Step S3 in FIG. 1 is completed by steps 406, 407, 409 and 410 in the present embodiment;

Step S4 in FIG. 1 is completed by steps 408, 408a or 408b as well as steps 116 to 120 in the present embodiment;

Step S5 in FIG. 1 is completed by steps 411 to 415 as well as steps 421 to 424 in the present embodiment;

Step S6 in FIG. 1 is completed by step 406a as well as steps 425 to 440 in the present embodiment.

Figure 12:
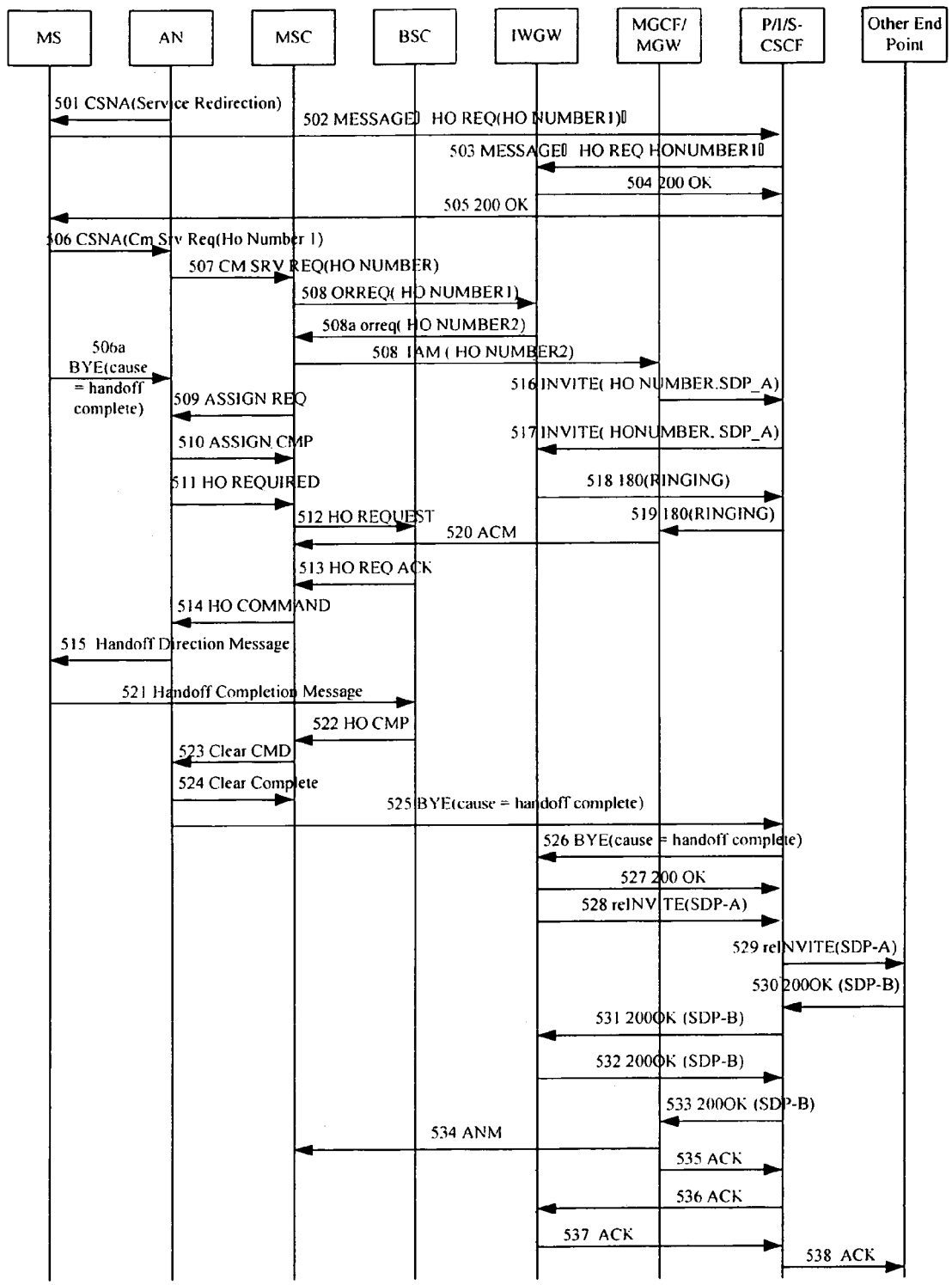
FIG. 12 is a signaling flowchart in accordance with the fifth embodiment of the present invention.

Embodiment 5: with reference to FIG. 12.

In this embodiment, the MS generates the handoff number and initiates the process of clearing the original call, and then the handoff from the PS domain to the CS domain is finished, this embodiment comprises the following steps:

501. Determining that the MS should be switched to the CS domain, the AN sends a CSNA message to the MS to command the MS to execute the handoff.

502. The MS generates the handoff number HO number1 and sends the handoff number to the P/I/S-CSCF through a SIP message 'MESSAGE' so as to notify the PS domain network that the handoff is to start. The handoff number can be generated by converting the IP address to the decimal format and adding a special field to the converted address.

503. The P/I/S-CSCF is triggered to forward this 'Message' SIP message to the IWGW according to iFC rules.

504: The IWGW returns a SIP message '200 OK' to the P/I/S-CSCF.

505. The P/I/S-CSCF forwards this SIP message '200 OK' to the MS.

506. As a response to the first CSNA message, the MS initiates a call by sending a CSNA message that comprises "Origination" contents, wherein the called number is HO number1. This step can be executed together with step 502.

506a. The MS constructs a SIP message 'BYE (cause=handoff complete)' that comprises the handoff complete indication and sends the message to the AN, the AN stores the message and waits for the CLEAR COMMAND message from the MSC.

507. The AN constructs a CM service request message concerning the CSNA (Origination) message and sends the CM service request message to the MSC in the CS domain.

As mentioned above, in Step S3, the MS can send an initial call request to the CS domain access network simulating entity, i.e. the IWS; the IWS simulates the CS access network and sends the initial call request to the CS domain call control entity, i.e. the MSC. As to this situation, step 507 should be modified as follows:

The AN forwards the CSNA message received in step 506 to the IWS. The IWS constructs the CM service request message concerning the CSNA (Origination) message and forwards the CM service request message to the MSC in the CS domain.

508. The MSC initiates an outgoing call to the MGCF, wherein the called number is the special handoff number as a Handoff Number.

508a. The IWGW finds out the existing session corresponding to HO number1 and returns HO number2 by sending an MAP response message 'orreq' to the MSC.

508b. the MSC initiates an outgoing call to the MGCF, wherein the called number is Handoff number 2.

509. The MSC sends an assignment message to the AN while step 508 is being executed.

When there is an IWS, the MSC will send the assignment message to the IWS.

510. On receiving the assignment message, the AN just returns an assignment complete message without establishing any air channel.

When there is an IWS, step 510 should be modified as follows:

On receiving the assignment message, the IWS just returns an assignment complete message without establishing any air channel.

511. The AN sends a Handoff Required message to initiate a CS domain handoff process.

When there is an IWS, step 511 should be modified as follows:

The IWS sends a Handoff Required message to initiate the CS domain handoff process.

512 to 515 are steps in the existing CS domain handoff process.

When there is an IWS, in step 514, the MSC will send an HO COMMAND message to the IWS. After receiving the HO COMMAND message, the IWS constructs a Handoff Direction Message according to the received message and then sends the Handoff Direction Message to the AN; in step 515, the AN forwards the received Handoff Direction Message to the MS.

516. The MGCF sends a SIP message 'INVITE' with the handoff number HO number2 and a content of SDP-A to the S-CSCF.

517. The S-CSCF forwards this SIP message 'INVITE' to the IWGW.

518. The IWGW confirms the handoff number Handoff number2 that is allocated by the IWGW itself and is brought by the SIP message 'INVITE', finds out the existing session corresponding to the handoff number, and then returns a SIP message '180' that without a content of SDP to the S-CSCF.

519. The S-CSCF forwards this SIP message '180' to the MGCF.

520. As a response to step 508, the MGCF sends an ACM message of ISUP to the MSC.

521 to 524. The MS starts the air interface handoff process to complete the subsequent handoff process in steps 512 to 515.

525. On receiving the CLEAR COMMAND message, the AN forwards the SIP message 'BYE (cause=handoff complete)' which is stored in step 506a and is used to inform the P/I/S-CSCF that the air interface handoff has finished.

526. The P/I/S-CSCF forwards the received SIP message 'BYE (cause=handoff complete)' to the IWGW.

527. The IWGW sends a SIP message '200 OK' to the P/I/S-CSCF as a response to the SIP message 'BYE (cause=handoff complete)'.

528. The IWGW sends a SIP message 'reINVITE' with a content of SDP-A to the S-CSCF.

529. The S-CSCF forwards the message to the remote node and the remote node replaces the recorded content SDP with SDP-A.

530. The remote node returns a content of SDP-B, which may be different from the SDP content in the previous session, to the IWGW by sending a SIP message '200 OK' to the S-CSCF.

531. The S-CSCF forwards this SIP message '200 OK' to the IWGW.

532. The IWGW sends a SIP message '200 OK' with a content of SDP-B to the S-CSCF so as to terminate the session started in step 517.

533. The S-CSCF forwards this SIP message '200 OK' to the MGCF.

534. The MGCF sends an ANM message to the MSC so as to complete the CS domain session.

535. The MGCF sends a SIP message 'ACK' to the S-CSCF.

536. The S-CSCF forwards the SIP message 'ACK' to the IWGW.

537. The IWGW sends a SIP message 'ACK' to the S-CSCF.

538. The S-CSCF forwards the SIP message 'ACK' to the remote node.

With reference to FIG. 1, Step S1 thereof is completed by step 501 in the present embodiment;

Step S2 in FIG. 1 is completed by steps 502 to 505 in the present embodiment;

Step S3 in FIG. 1 is completed by steps 506, 507, 509 and 510 in the present embodiment;

Step S4 in FIG. 1 is completed by steps 508, 508a or 508b as well as steps 516 to 520 in the present embodiment; Step S5 in FIG. 1 is completed by steps 511 to 515 as well as steps 521 to 524 in the present embodiment;

Step S6 in FIG. 1 is completed by step 506a as well as steps 525 to 538 in the present embodiment.

A CS domain access network simulating entity is also provided to support the method in accordance with the embodiments of the present invention. The CS domain access network simulating entity comprises a CS domain calling signaling processing module and a CS domain handoff module.

The CS domain calling signaling processing module is used for processing signaling from the CS domain calling side. It is respectively connected to the PS domain access network, the CS domain call control entity and the CS domain handoff module.

The CS domain handoff module is used for processing and forwarding the received switch signaling. It is respectively connected to the PS domain access network, the CS domain call control entity and the CS domain calling signaling processing module.

A PS domain access network is provided to support the method in accordance with the embodiments of the present invention. Beside the existing PS domain access module, the PS domain access network further comprises CS domain calling signaling processing module and CS domain handoff module.

The CS domain calling signaling processing module is used for processing signaling from the CS domain calling side. It is respectively connected to the PS domain access module, the CS domain call control entity and the CS domain handoff module.

The CS domain handoff module is used for processing and forwarding the received switch signaling. It is respectively connected to the PS domain access module, the CS domain call control entity and the CS domain calling signaling processing module.

Any one of the CS domain access network simulating entity and the PS domain access network can support the network side in accordance with the embodiments of the present invention. In other words, the CS domain calling signaling processing module and the CS domain handoff module can be integrated in the entity of the PS domain access network, or be integrated in the CS domain access network simulating entity.

An MS is also provided to support the method in accordance with the embodiments of the present invention. The MS comprises a first session module used for the original PS domain session and further comprises a handoff number processing module, a second session module and a handoff processing module.

The handoff number processing module, connected to the second session module, is used for obtaining the handoff number.

Specifically speaking, if the handoff number is generated by the MS itself, the handoff number processing module is used for generating the handoff number and sending the handoff number to network side as well as for providing the second session module with the handoff number.

If the handoff number is generated by the network side, the handoff number processing module is used for sending an application to the network side and receiving the handoff number sent by the network side as well as for providing the second session module with the handoff number.

If the handoff number is specified statically in advance, the handoff number processing module is used for storing the handoff number as well as for providing the second session module with the handoff number.

The second session module is used for initiating the call toward the CS domain network through the PS domain access network by taking the handoff number as the called number The second session module is connected to the handoff number processing module.

The handoff processing module is used for performing the air interface handoff from the PS domain to the CS domain and interacting with the network side to make the network side finish the network side handoff from the PS domain to the CS domain.

To sum up, the above illustrations are preferable embodiments of the present invention and are not used to confine the present invention. Any modification, equivalent substitute and improvement within the spirit of the present invention are covered within the protection scope of the present invention.

The invention claimed is:

1. A method for handoff from a Packet Switched (PS) domain to a Circuit Switched (CS) domain comprising:
when it is needed to handoff from the PS domain to the CS domain, a Mobile Station (MS) obtaining a handoff number and initiating a CS domain session to an Interworking Gateway (IWS) in a PS domain access network by taking the handoff number as a called number;
the IWS directly delivering the CS domain session to a Mobile Switching Center (MSC) in the CS domain;
an Interworking Gateway (IWGW) associating the CS domain session to an original session of the MS;
the IWS notifying the MS to perform an air interface handoff from the PS domain to the CS domain; and
the MS notifying the IWGW to finish the air interface handoff from the PS domain to the CS domain.

2. The method according to claim 1, wherein the MS obtaining the handoff number comprises the MS generating the handoff number and sending the generated handoff number to the IWGW; and
wherein the IWGW associating the CS domain session to the original session of the MS comprises the MSC triggering the CS domain session to the IWGW, and the IWGW associating the CS domain session to the original session of the MS according to the called number and a calling number.

3. The method according to claim 1, wherein the MS obtaining the handoff number comprises the IWGW allocating the handoff number to the MS and sending the handoff number to the MS; and
wherein the IWGW associating the CS domain session to the original session of the MS comprises the MSC routing the CS domain session to the PS domain access network, the PS domain access network triggering the CS domain session to the IWGW, and the IWGW associating the CS domain session to the original session of the MS according to the information of the CS domain session.

4. The method according to claim 1, wherein the MS obtaining the handoff number comprises assigning the handoff number to the MS in advance; and
wherein the IWGW associating the CS domain session to the original session of the MS comprises the MSC directly connecting the CS domain session to the PS domain access network according to the called number, the PS domain access network triggering the CS domain session to the IWGW, and the IWGW associating the CS domain session to the original session of the MS according to a calling number and the called number.

5. The method according to claim 1, wherein the MS notifying the IWGW to finish the air interface handoff from the PS domain to the CS domain comprises:
the MS sending a switch start notification to the IWGW through the PS domain; and
the IWGW connecting the original session of the MS to the CS domain session and completing the air interface handoff.

6. The method according to claim 1, before the MS performs the air interface handoff from the PS domain to the CS domain, further comprising:
the MS sending a switch complete notification to the PS domain access network and the PS domain access network storing the switch complete notification.

7. The method according to claim 6, wherein the MS notifying the IWGW to finish the air interface handoff from the PS domain to the CS domain comprises:
the MS handing off to the air interface of a CS domain network and notifying the PS domain access network to clear the original connection;
the PS domain access network sending the stored switch complete notification to the IWGW; and
the IWGW connecting the original session of the MS to the CS domain session and completing the air interface handoff.

8. The method according to claim 3, wherein after completion of connection between the PS domain access network and the CS domain call control entity, the PS domain access network sending a handoff application to the MSC before sending a handoff command to the MS.

9. The method according to claim 1, wherein the IWS is integrated in the PS domain access network.

10. The method according to claim 1, wherein the IWS is an independent entity in the PS domain access network.

11. The method according to claim 1, wherein the IWS notifying the MS to perform the air interface handoff from the PS domain to the CS domain comprises:
the IWS sending a handoff application to the MSC; and
the MS starting the air interface handoff according to an existing handoff mechanism.

12. A system for handoff from a Packet Switched (PS) domain to a Circuit Switched (CS) domain comprising:
a Mobile Station (MS), an Interworking Gateway (IWS) in a PS domain access network, and a Mobile Switching Center (MSC) in the CS domain and an Interworking Gateway (IWGW),
wherein the MS obtains a handoff number when it is needed to switch from the PS domain to the CS domain, initiates a CS domain session to the IWS by taking the handoff number as a called number, and notifies the IWGW to finish the handoff from the PS domain to the CS domain, the IWS directly delivers the CS domain session to the MSC, and notifies the MS to perform an air interface handoff from the PS domain to the CS domain, and the IWGW associates the CS domain session to an original session of the MS.

13. The system according to claim 12, wherein the IWS notifies the MS to perform the air interface handoff from the PS domain to the CS domain comprises:

the IWS sends the handoff application to the MSC; and
the MS starts the air interface handoff according to an existing handoff mechanism.

* * * * *

UNITED STATES PATENT AND TRADEMARK OFFICE
CERTIFICATE OF CORRECTION

PATENT NO.       : 7,522,585 B2
APPLICATION NO.  : 11/499925
DATED            : April 21, 2009
INVENTOR(S)      : Wenyu Liu et al.

It is certified that error appears in the above-identified patent and that said Letters Patent is hereby corrected as shown below:

Column 17, lines 34-35: "an Interworking Gateway (IWS)" should be "an Interworking System (IWS)"

Column 18, line 57: "an Interworking Gateway (IWS)" should be "an Interworking System (IWS)"

Signed and Sealed this
Fifteenth Day of November, 2011

David J. Kappos
*Director of the United States Patent and Trademark Office*